United States Patent [19]
Nixon

[11] Patent Number: 5,883,786
[45] Date of Patent: Mar. 16, 1999

[54] SIM CARD CONTAINMENT ASSEMBLY FOR AN ELECTRONIC APPARATUS

[75] Inventor: Patrick E. Nixon, Raleigh, N.C.

[73] Assignee: Ericsson, Inc., Research Triangle Park, N.C.

[21] Appl. No.: 777,625

[22] Filed: Dec. 31, 1996

[51] Int. Cl.[6] ............................... H04B 1/03; H05K 1/14
[52] U.S. Cl. ..................... 361/737; 361/814; 439/630; 455/90
[58] Field of Search ..................................... 361/737, 752, 361/730, 756, 796, 814; 455/90; 439/630

[56] References Cited

U.S. PATENT DOCUMENTS 5,669,069   9/1997   Rautila ..................................... 455/558

*Primary Examiner*—Leo P. Picard
*Assistant Examiner*—Jayprakash N. Gandhi
*Attorney, Agent, or Firm*—Nixon & Vanderhye PC

[57] ABSTRACT

A SIM card containment assembly eliminates the locking mechanism of the conventional arrangement and simplifies construction to thereby minimize parts and allow for easy access to the SIM card. The structure includes a SIM connector electrically coupled to the device PCB and engageable with the SIM card, and a SIM card door releasably engageable with the apparatus housing. The SIM card door, in a closed position, engages the SIM card and maintains the SIM card in engagement with the SIM connector. The SIM connector or the device housing itself preferably includes alignment structure that contains the SIM card laterally and ensures that the SIM card is properly aligned in the SIM connector.

33 Claims, 6 Drawing Sheets

SIM CARD CONTAINMENT ASSEMBLY FOR AN ELECTRONIC APPARATUS

BACKGROUND OF THE INVENTION

The present invention relates to a subscriber identification module (SIM) card containment assembly and, in particular, to a SIM card containment assembly for an electronic apparatus such as a cellular phone that utilizes a simplified structure to secure the SIM card in its correct position with minimum parts while allowing easy access.

A subscriber identification module (SIM) card in a cellular phone is typically used for billing and security. The SIM card may also be used for storing operational data such as a phone book and/or quick dial numbers. With a SIM card, a user can operate various phones and still retain, for example, the same phone book and billing charge number. The SIM card thus eliminates the need to reprogram phone numbers and enables a single customer account for multiple phones.

The SIM card is typically mounted in the housing of the cellular phone and secured with a latching assembly. Various latching assemblies are known, however, they typically contain two or more distinct components. When the SIM card is located in a cosmetic region of the phone, a door is typically used to access the SIM card. A separate latching mechanism is integrated into the connector to securely hold the SIM card. In this arrangement, the user must open the door and then unlatch the card by sliding a locking mechanism and/or rotating the lock to gain access to the SIM card. This manipulation can be very difficult due to the small parts and intricate areas involved.

SUMMARY OF THE INVENTION

In accordance with the present invention, there is provided a SIM card containment assembly that allows easy access to the SIM card and does not have multiple complicated parts. The basic construction of the invention consists of a sliding or pivoting cosmetic door that covers the SIM card and securely holds/engages the SIM card in the correct position within/on the SIM connector. In one arrangement, the SIM connector is snapped into the rear housing of the cellular phone. Alternatively, the SIM connector can be fixed directly to the device printed circuit board (PCB). Another feature of the invention is that the SIM card door is prevented from being opened unless the phone battery is removed. This arrangement prevents the SIM card from being removed from the phone when the phone is operating. An additional characteristic of the invention is the latch on the SIM card door that locks the door to the rear housing. The latch is significant because the door thereby is prevented from sliding unintentionally when the battery is removed from the phone. The snap is configured, however, to allow the user to gain access the SIM card by pressing the SIM card door above the latch and sliding the door open. When the door is open, the SIM card can be removed by simply turning the phone upside-down and allowing the SIM card to fall out. When the door is closed, the door applies pressure to the SIM card to ensure sufficient contact between the SIM card and the SIM connector.

In an alternative arrangement, the housing, as opposed to the connector itself, acts as the locating feature for the SIM card, and the SIM card door applies the pressure necessary to have a satisfactory connection between the SIM card and the SIM connector. Similar to above, the SIM card can only be removed when the door latch is released.

These and other aspects of the invention are embodied in an electronic apparatus including an apparatus housing encasing components of the electronic apparatus. The apparatus includes a subscriber identification module (SIM) card, a printed circuit board (PCB), a SIM connector electrically coupled to the PCB and engageable with the SIM card, and a SIM card door releasably engageable with the apparatus housing. The SIM connector electrically connects the SIM card to the PCB when the SIM card is engaged with the SIM connector. The SIM card door, in a closed position, engages the SIM card and maintains the SIM card in engagement with the SIM connector.

The SIM card door may be provided with an urging protrusion disposed on a surface facing the SIM card. The protrusion engages the SIM card when the door is in the closed position and urges the SIM card into engagement with the SIM connector. The SIM connector and the SIM card preferably include alignment structure that ensures that the SIM card is properly aligned in the SIM connector. In one arrangement, the SIM connector includes a well shaped corresponding to a perimeter of the SIM card. The well houses the SIM card when the SIM card is engaged with the SIM connector. The alignment structure may be provided in the well of the SIM connector. The apparatus may further include a battery securable to the apparatus housing that supplies power to the electronic apparatus. In this context, the SIM card door in a closed position is disposed between the battery and the apparatus housing. The SIM card is preferably slidably attachable to the apparatus housing from a position corresponding to a position of the battery when the SIM card door is in the closed position.

The SIM card door may include a latch that is releasably securable to the apparatus housing. In one embodiment, the SIM card door is slidably attachable to the apparatus housing, and the latch is disposed at a forward end of the SIM card door relative to a sliding closed direction. In another embodiment, the SIM card door is pivotably attached at a first end to the apparatus housing, and the latch is disposed at a second end of the SIM card door opposite from the first end. The apparatus may include a plurality of connector snaps secured to the apparatus housing, wherein the SIM connector is releasably attachable to the connector snaps to releasably secure the SIM connector in the apparatus housing. The connector snaps are preferably molded integral with the apparatus housing. Moreover, the connector snaps may include protrusions that each extend from a base thereof, respectively. The SIM connector rests on the protrusions when secured in the apparatus housing.

The apparatus housing itself may include a channel defined in a central portion thereof. In this context, the SIM card is disposed in the channel of the apparatus housing. Similar to above, the channel in the SIM card may include alignment structure for ensuring that the SIM card is properly aligned in the SIM connector. In one arrangement, the SIM card door includes a pivot assembly at a first end thereof. The pivot assembly is attached to the apparatus housing, and the SIM card door includes a latch at a second end thereof. The latch is releasably engageable with the apparatus housing.

In accordance with another aspect embodying the present invention, there is provided a SIM card containment assembly for securing a SIM card in a housing of an electronic apparatus. The SIM card containment assembly includes a SIM connector electrically coupled to a printed circuit board of the electronic apparatus and engageable with the SIM card. The SIM connector electrically connects the SIM card to the PCB when the SIM card is engaged with the SIM connector. The SIM card containment assembly also includes a SIM card door releasably engageable with the apparatus housing. In the closed position, the SIM card door engages the SIM card and maintains the SIM card in engagement with the SIM connector.

In still another aspect embodied by the invention, there is provided a cellular phone including a SIM card, a printed circuit board, a SIM connector electrically coupled to the PCB and engageable with the SIM card, an apparatus housing encasing the SIM card, PCB and the SIM connector, and a SIM card door releasably engageable with the apparatus housing. The SIM card door, in a closed position, engages the SIM card and maintains the SIM card in engagement with the SIM connector.

BRIEF DESCRIPTION OF THE DRAWINGS

These and other aspects and advantages embodied by the present invention will emerge in view of the following detailed description of preferred embodiments read in conjunction with the accompanying drawings, in which.

DETAILED DESCRIPTION OF PREFERRED EMBODIMENTS

In the following detailed description, the SIM card containment assembly according to the invention will be described in conjunction with its application to a cellular phone. The structure according to the invention, however, is applicable to any electronic apparatus that utilizes a SIM card, and the invention is not meant to be limited to its use in a cellular phone. The application to the cellular phone is thus for illustrative purposes only.

Figure 1:
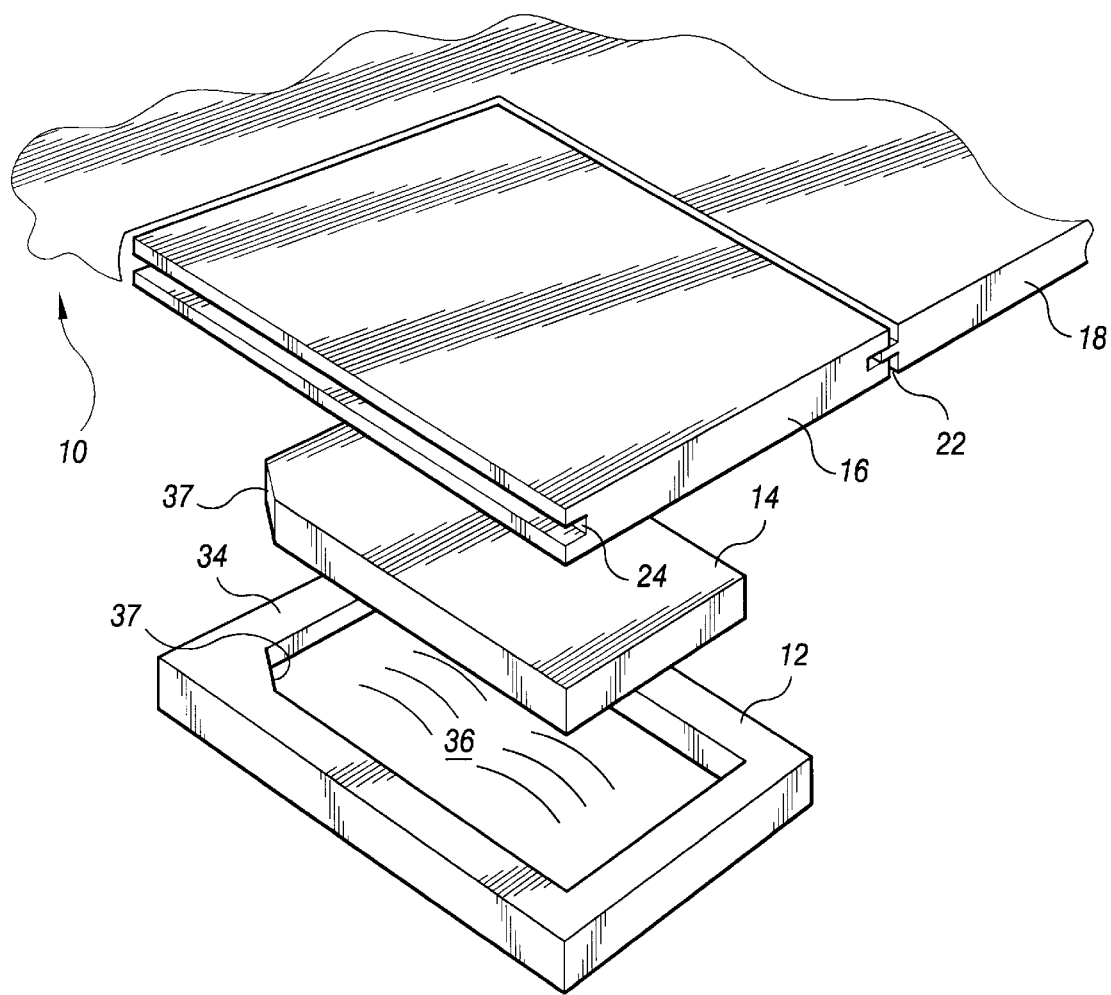
FIG. 1 is a perspective assembly drawing of one SIM card containment assembly according to the invention.
Figure 2:
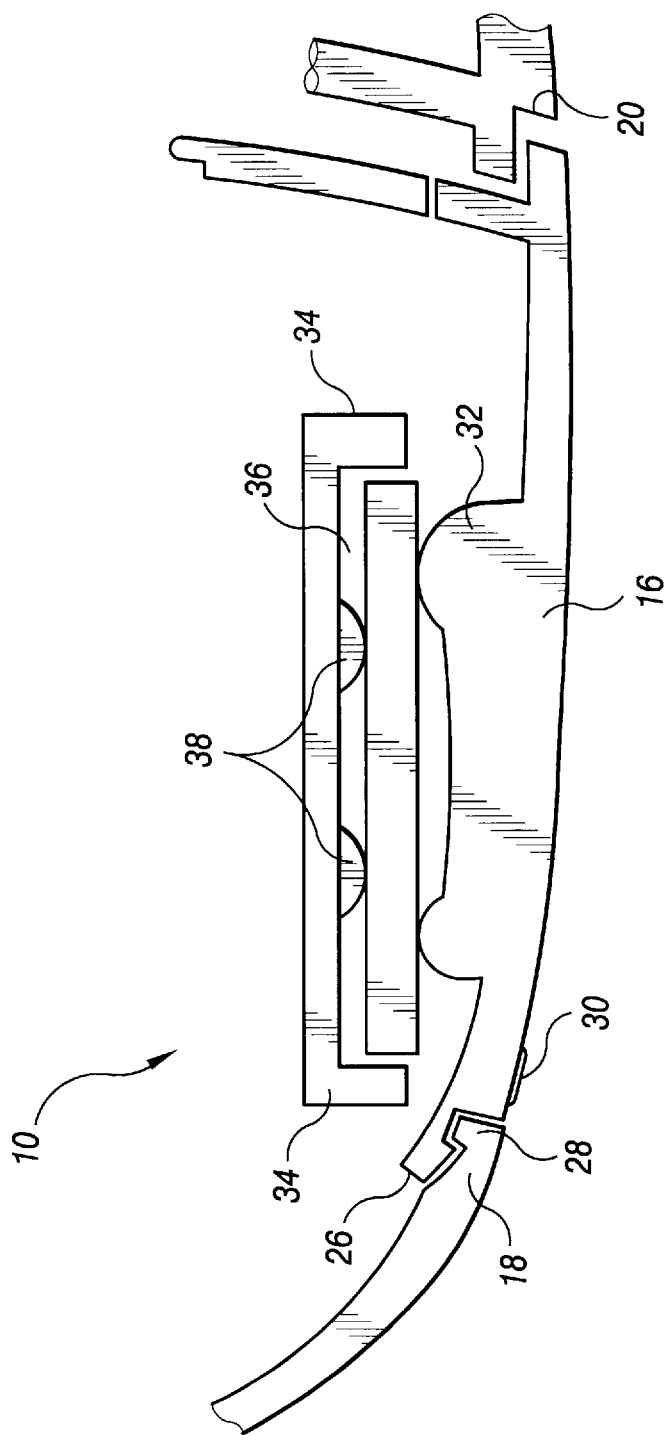
FIG. 2 is a sectional side view of the containment assembly shown in FIG. 1.

Referring to FIGS. 1 and 2, a SIM card containment assembly 10 according to a first embodiment of the invention is shown. The assembly 10 includes a SIM connector 12 which is electrically coupled with the printed circuit board (PCB) of a phone, a SIM card 14 and a SIM card door 16. The assembly 10 is integrated with the cellular phone by connections with the phone housing 18 and/or the phone battery 20.

The phone housing 18 is typically molded plastic and includes a door protrusion 22 integral therewith. The SIM card door 16 is also preferably molded plastic and includes a channel 24 corresponding to the protrusion 22 for slidably engaging the protrusion 22. A forward end of the SIM card door 16 includes a latch 26 engageable with a corresponding latch 28 of the phone housing 18. In the closed position shown in FIG. 2, the latches 26, 28 prevent the SIM card door 16 from being inadvertently slid open. The latches are released by depressing an area 30 on the SIM card door 16 and sliding the door off of the housing 18. As shown in FIG. 2, when the battery 20 is secured to the device in a conventional manner, the SIM card door 16 is prevented from being opened. In this context, this structure prevents access to the SIM card when the phone is in use.

On a side of the SIM card door 16 facing the SIM card 14 there is provided one or more urging protrusions 32 that are adapted to engage the SIM card 14 when the SIM card door 16 is in the closed position and urge the SIM card 14 into engagement with the SIM connector 12. In the closed position as shown in FIG. 2, the SIM card 14 engages one or more contacts 38 of the SIM connector. The contacts 38 are electrically coupled with the device PCB. The SIM connector 12 is provided with side walls 34 that define a well 36 shaped corresponding to a perimeter of the SIM card. The well 36 receives the SIM card 14 and prevents the SIM card 14 from shifting laterally out of contact with the SIM connector 12. The well 36 and the SIM card 14 are provided with alignment edges such as a cropped corner 37 to ensure proper alignment of the SIM card 14 in the SIM connector 12. Any suitable alignment structure could be used and the invention is not meant to be limited to the cropped corner shown in FIG. 1. Examples of other alignment structure include other key arrangements such as tab and slot, pin and hole, etc.

Figure 3:
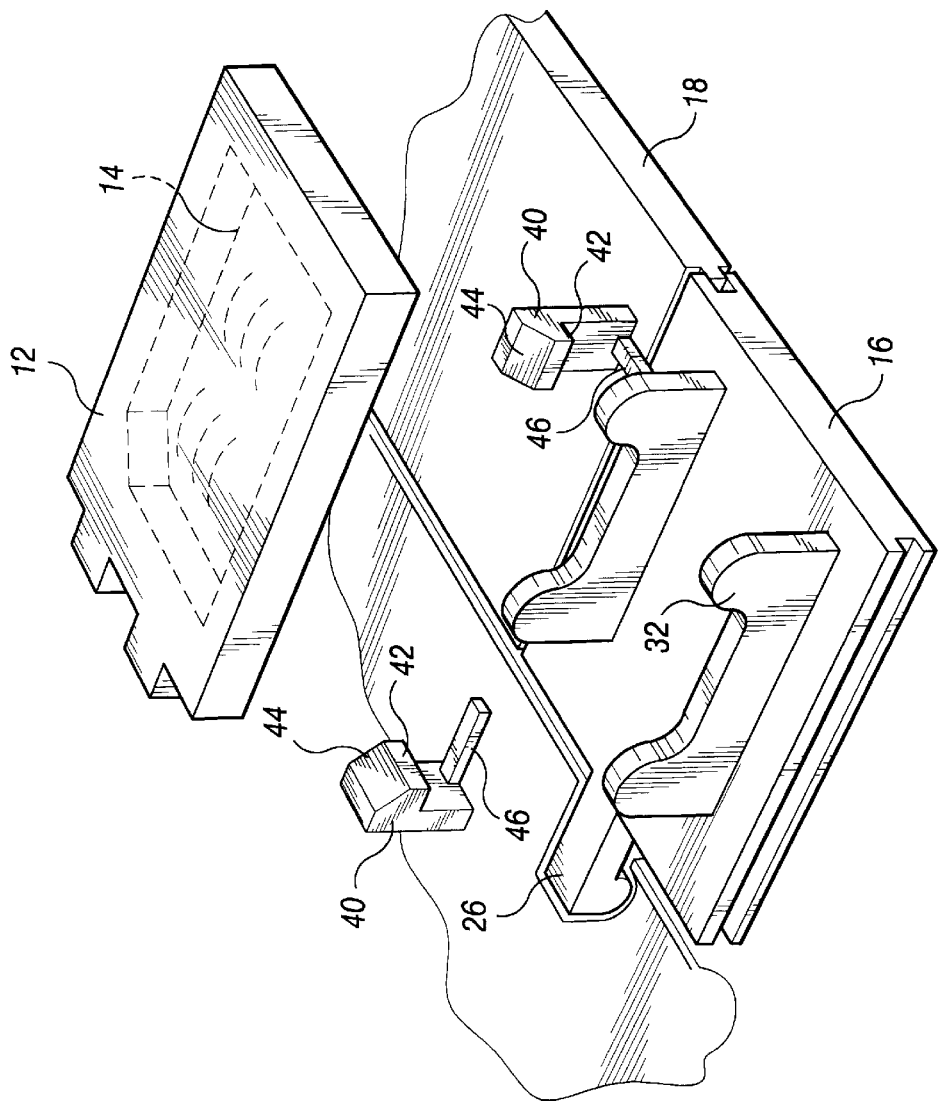
FIG. 3 is a perspective view of the SIM connector attachment assembly shown in FIG. 1.

Referring to FIG. 3, the SIM connector is secured in the housing 18 via a plurality of connector snaps 40. The connector snaps 40 are preferably molded integral with the housing 18 and include a snap portion 42, a guide surface 44 and a protrusion 46 extending from a base of the connector snap 40. As the SIM connector is urged along the guide surfaces 44 of the connector snaps 40, the connector snaps are deflected slightly outward, and the SIM connector 12 is snapped in place adjacent the snap portions 42. The SIM connector 12 rests on the protrusions 46 when secured in the phone housing. By placing the snaps or similar containing structure on all edges of the connector, the lateral position of the connector can be maintained.

In the arrangements shown in FIGS. 1–3, the SIM card door 16 can be slid open when the battery 20 is removed. When the SIM card door 16 is opened, the SIM card 14 can be placed in (or removed from) the well 36 of the SIM connector 12, properly aligned by virtue of the alignment structure 37, and when the SIM card door 16 is subsequently slid closed and latched, the SIM card 14 is then properly engaged. No additional locking mechanism is required to contain the SIM card 14.

Figure 4:
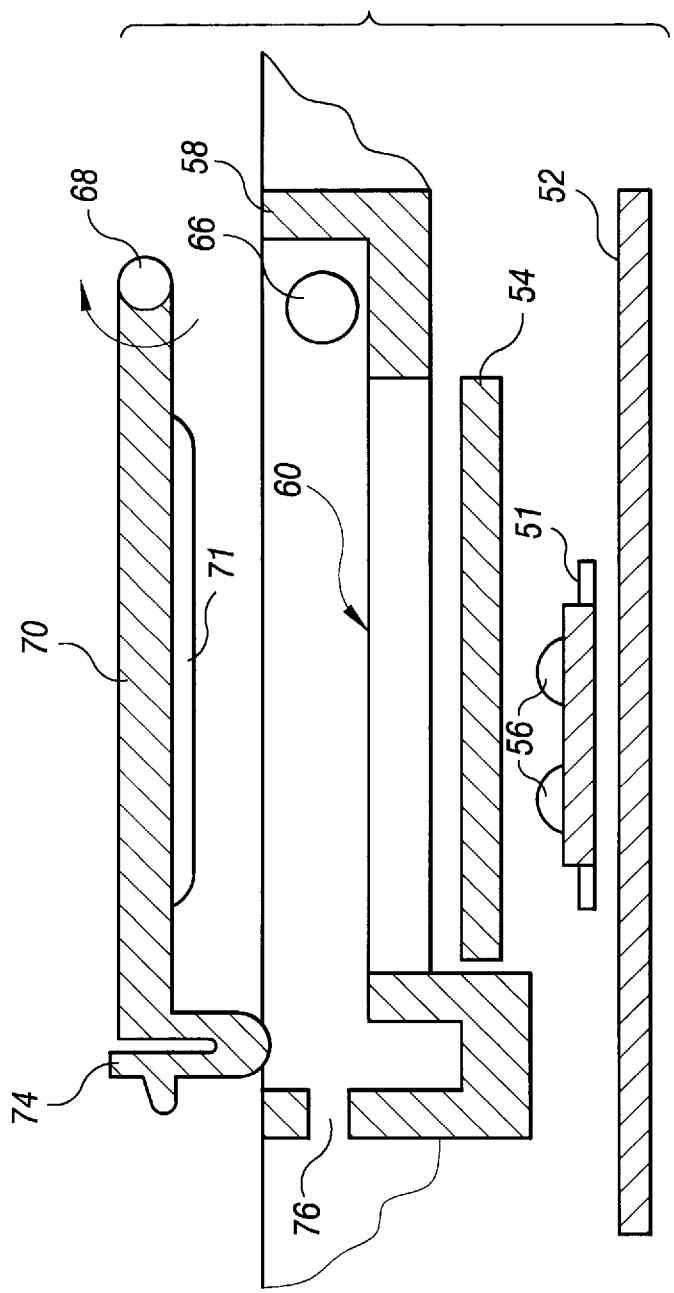
FIG. 4 is a sectional view of an alternative SIM card containment assembly according to the present invention.
Figure 5:
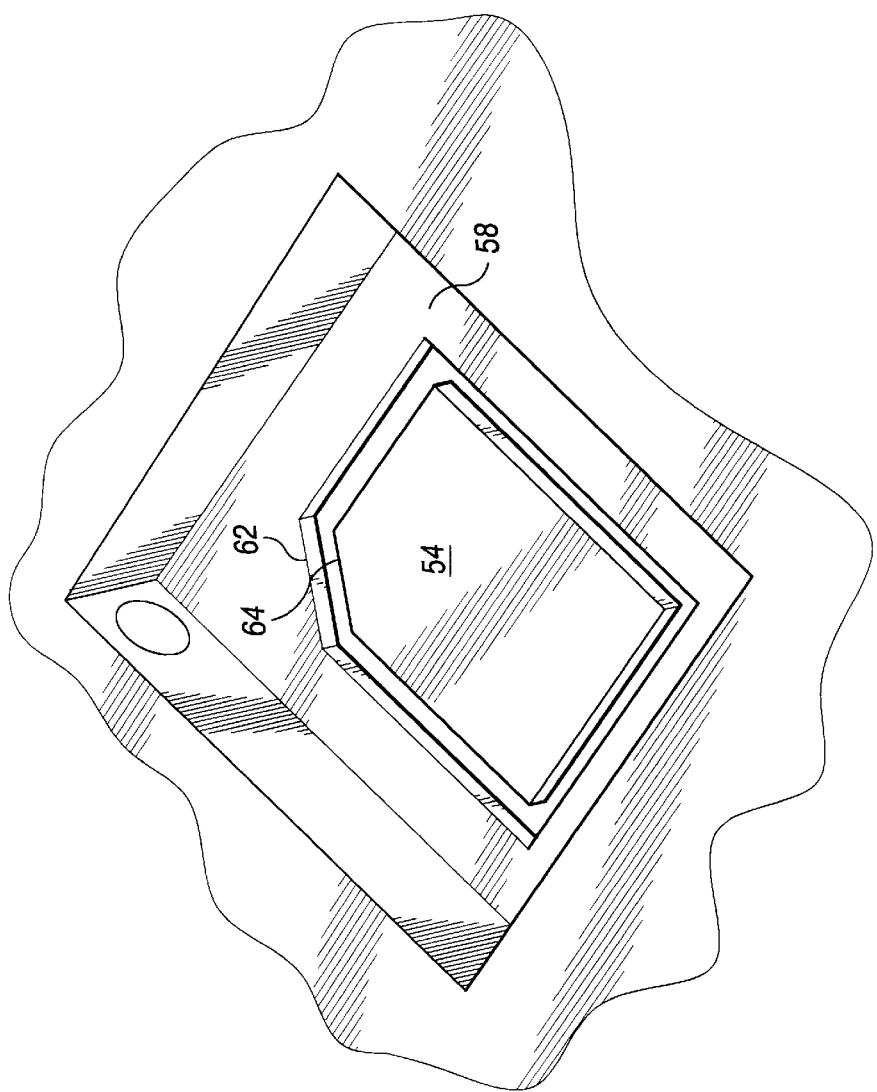
FIG. 5 is a perspective view of the containment assembly shown in FIG. 4.
Figure 6:
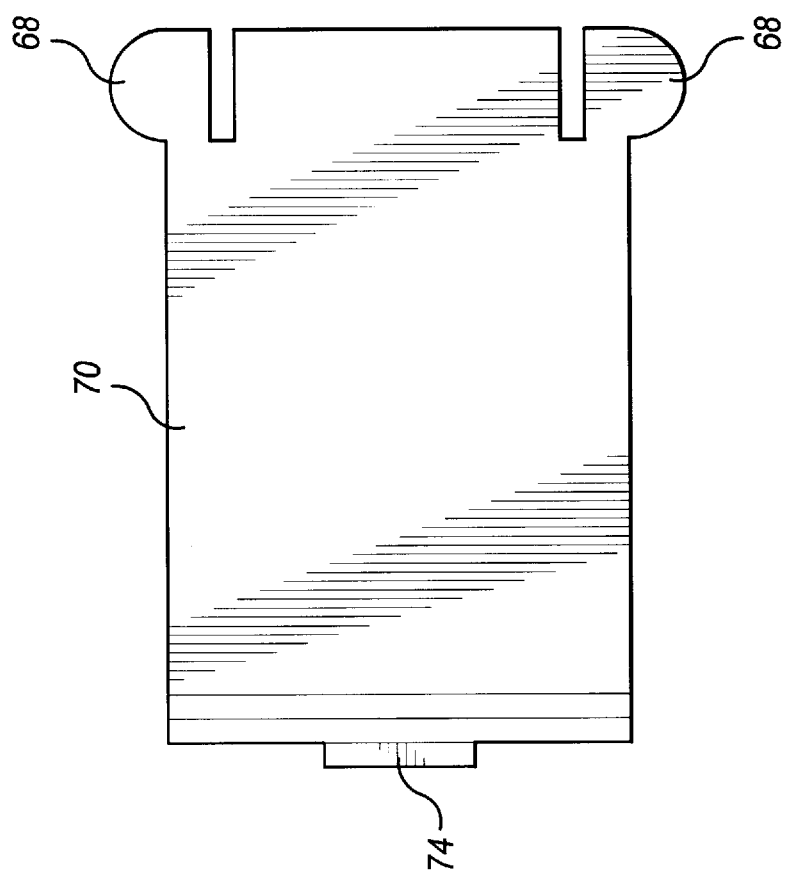
FIG. 6 is a plan view of the SIM card door in the embodiment illustrated in FIG. 4.

FIGS. 4–6 illustrate a second embodiment SIM card containment assembly according to the present invention. In this embodiment, the SIM connector is significantly reduced in size and is preferably fixed to the PCB 52 by soldering or the like. The SIM card 54 rests on contacts 56 of the SIM connector 51.

As shown in FIGS. 4 and 5, the housing 58 is formed with an opening 60 therein that is shaped corresponding to the perimeter of the SIM card 54. Similar to the well 36 in the first embodiment, the opening 60 includes an alignment edge 62 cooperating with an alignment side 64 of the SIM card 54. The alignment edge 62 and the alignment side 64 ensure that the SIM card 54 is properly inserted into the housing.

The housing 58 is also formed with a pair of indentations 66 (one shown in FIG. 4). The indentations 66 receive pivot ends 68 of a SIM card door 70. As shown in FIG. 6, the SIM card door 70 includes a pair of slots 72 formed adjacent the pivot ends 68, enabling the pivot ends to be deflected for a snap-like fit in the housing indentations 66. An urging protrusion 71 is formed on a side of the SIM card door 70 facing the SIM card 54. This protrusion 71 serves the same purpose as the protrusion 32 in the first embodiment. A latching mechanism 74 is provided at a forward end of the SIM card door 70 opposite from the pivot ends 68. The latching mechanism 74 engages a corresponding latch aperture 76 in the housing 58. The pivot structure and latching mechanism illustrated in FIGS. 4 and 6 is one of several structures that can achieve the desired pivoting and latching function for the SIM card door, and those of ordinary skill in the art will contemplate other configurations that are suitable for the containment assembly that fall within the scope of the invention. The invention is thus not meant to be limited to the described structure.

By virtue of the structure according to the present invention, a SIM card for an electronic apparatus such as a cellular phone can be accurately secured in the apparatus housing while minimizing parts and allowing for easy access to the SIM card. Further simplification of the conventional structure is achieved by eliminating the locking mechanism of a typical SIM connector.

While the invention has been described in connection with what is presently considered to be the most practical and preferred embodiments, be understood that the invention is not to be limited to the disclosed embodiments, but on the contrary, is intended to cover various modifications and equivalent arrangements included within the spirit and scope of the appended claims.

What is claimed is:

1. An electronic apparatus including an apparatus housing encasing components of the electronic apparatus, the apparatus comprising:
   a subscriber identification module (SIM) card;
   a printed circuit board (PCB);
   a SIM connector electrically coupled to said PCB and engageable with said SIM card, said SIM connector electrically connecting said SIM card to said PCB when said SIM card is engaged with said SIM connector; and
   a SIM card door releasably engageable with the apparatus housing, said SIM card door, in a closed position, engaging said SIM card and maintaining said SIM card in engagement with said SIM connector, wherein when said SIM card door is in an open position, said SIM card is contained from movement in a lateral plane defined by said SIM card.

2. An electronic apparatus according to claim 1, wherein said SIM card door comprises an urging protrusion disposed on a surface facing said SIM card, said protrusion engaging said SIM card when said door is in the closed position and urging said SIM card into engagement with said SIM connector.

3. An electronic apparatus according to claim 1, wherein said SIM connector and said SIM card comprise alignment means for ensuring that said SIM card is properly aligned in said SIM connector.

4. An electronic apparatus according to claim 1, wherein said SIM connector comprises a well shaped corresponding to a perimeter of said SIM card, said well housing said SIM card when said SIM card is engaged with said SIM connector.

5. An electronic apparatus according to claim 4, wherein said well and said SIM card comprise alignment means for ensuring that said SIM card is properly aligned in said SIM connector.

6. An electronic apparatus according to claim 1, further comprising a battery securable to the apparatus housing that supplies power to the electronic apparatus, said SIM card door in the closed position being disposed between said battery and the apparatus housing.

7. An electronic apparatus according to claim 6, wherein said SIM card door is slidably attachable to the apparatus housing from a position corresponding to a position of said battery when said SIM card door is in the closed position.

8. An electronic apparatus according to claim 1, wherein said SIM card door comprises a latch that is releasably securable to the apparatus housing.

9. An electronic apparatus according to claim 8, wherein said SIM card door is slidably attachable to the apparatus housing, and wherein said latch is disposed at a forward end of said SIM card door relative to a sliding closed direction.

10. An electronic apparatus according to claim 8, wherein said SIM card door is pivotably attached at a first end to the apparatus housing, and wherein said latch is disposed at a second end of said SIM card door opposite from said first end.

11. An electronic apparatus according to claim 1, further comprising a plurality of connector snaps secured to the apparatus housing, said SIM connector being releasably attachable to said connector snaps to releasably secure said SIM connector in the apparatus housing.

12. An electronic apparatus according to claim 11, wherein said connector snaps are molded integral with the apparatus housing.

13. An electronic apparatus according to claim 12, wherein said connector snaps comprise protrusions each extending from a base thereof, respectively, said SIM connector resting on said protrusions when secured in the apparatus housing.

14. An electronic apparatus according to claim 1, further comprising containment structure that laterally contains and locates said SIM connector in the apparatus housing.

15. An electronic apparatus according to claim 1, wherein the apparatus housing includes a channel defined in a central portion thereof, said SIM card being disposed in the channel.

16. An electronic apparatus according to claim 15, wherein said channel and said SIM card comprise alignment means for ensuring that said SIM card is properly aligned with said SIM connector.

17. An electronic apparatus according to claim 1, wherein said SIM card door comprises a pivot assembly at a first end thereof, said pivot assembly being attached to the apparatus housing, and wherein said SIM card door comprises a latch at a second end thereof, said latch being releasably engageable with the apparatus housing.

18. A subscriber identification module (SIM) card containment assembly for securing a SIM card in a housing of an electronic apparatus, the SIM card containment assembly comprising:
   a SIM connector electrically coupled to a printed circuit board (PCB) of the electronic apparatus and engageable with the SIM card, said SIM connector electrically connecting the SIM card to the PCB when the SIM card is engaged with said SIM connector; and
   a SIM card door releasably engageable with the apparatus housing, said SIM card door, in a closed position, engaging the SIM card and maintaining the SIM card in engagement with said SIM connector, wherein when said SIM card door is in an open position, said SIM card is contained from movement in a lateral plane defined by said SIM card.

19. A SIM card containment assembly according to claim 18, wherein said SIM card door comprises an urging protrusion disposed on a surface facing the SIM card, said protrusion engaging the SIM card when said door is in the closed position and urging the SIM card into engagement with said SIM connector.

20. A SIM card containment assembly according to claim 18, wherein said SIM connector comprises alignment means for ensuring that the SIM card is properly aligned in said SIM connector.

21. A SIM card containment assembly according to claim 18, wherein said SIM connector comprises a well shaped corresponding to a perimeter of the SIM card, said well housing the SIM card when the SIM card is engaged with said SIM connector.

22. A SIM card containment assembly according to claim 21, wherein said well comprises alignment means for ensuring that the SIM card is properly aligned in said SIM connector.

23. A SIM card containment assembly according to claim 18, wherein said SIM card door comprises a latch that is releasably securable to the apparatus housing.

24. A SIM card containment assembly according to claim 23, wherein said SIM card door is slidably attachable to the apparatus housing, and wherein said latch is disposed at a forward end of said SIM card door relative to a sliding closed direction.

25. A SIM card containment assembly according to claim 23, wherein said SIM card door is pivotably attached at a first end to the apparatus housing, and wherein said latch is disposed at a second end of said SIM card door opposite from said first end.

26. A SIM card containment assembly according to claim 18, further comprising a plurality of connector snaps secured to the apparatus housing, said SIM connector being releasably attachable to said connector snaps to releasably secure said SIM connector in the apparatus housing.

27. A SIM card containment assembly according to claim 26, wherein said connector snaps are molded integral with the apparatus housing.

28. A SIM card containment assembly according to claim 27, wherein said connector snaps comprise protrusions each extending from a base thereof, respectively, said SIM connector resting on said protrusions when secured in the apparatus housing.

29. A SIM card containment assembly according to claim 18, further comprising containment structure that laterally contains and locates said SIM connector in the apparatus housing.

30. A SIM card containment assembly according to claim 18, wherein the apparatus housing includes a channel defined in a central portion thereof, the SIM card being disposed in the channel.

31. A SIM card containment assembly according to claim 30, wherein said channel comprises alignment means for ensuring that the SIM card is properly aligned with said SIM connector.

32. A SIM card containment assembly according to claim 18, wherein said SIM card door comprises a pivot assembly at a first end thereof, said pivot assembly being attached to the apparatus housing, and wherein said SIM card door comprises a latch at a second end thereof, said latch being releasably engageable with the apparatus housing.

33. A cellular phone comprising:

a subscriber identification module (SIM) card;

a printed circuit board (PCB);

a SIM connector electrically coupled to said PCB and engageable with said SIM card, said SIM connector electrically connecting said SIM card to said PCB when said SIM card is engaged with said SIM connector;

an apparatus housing encasing said SIM card, said PCB and said SIM connector; and a SIM card door releasably engageable with said apparatus housing, said SIM card door, in a closed position, engaging said SIM card and maintaining said SIM card in engagement with said SIM connector, wherein when said SIM card door is in an open position, said SIM card is contained from movement in a lateral plane defined by said SIM card.

* * * * *